United States Patent
Mohanty et al.

(10) Patent No.: US 11,332,371 B2
(45) Date of Patent: May 17, 2022

(54) METHODS FOR CREATION OF SUB-MICRON BIOCARBON MATERIALS FROM BIOMASS AND THEIR FIELDS OF APPLICATION

(71) Applicant: University of Guelph, Guelph (CA)

(72) Inventors: Amar Kumar Mohanty, Guelph (CA); Manjusri Misra, Guelph (CA); Singaravelu Vivekanandhan, D. Perumapalayam (IN); Prasad Gonugunta, Ilavara (IN); Tao Wang, Guelph (CA); Arturo Rodriguez Uribe, Guelph (CA); Mike Tiessen, Kingsville (CA); Atul Bali, Markham (CA)

(73) Assignee: UNIVERSITY OF GUELPH, Guelph (CA)

( * ) Notice: Subject to any disclaimer, the term of this patent is extended or adjusted under 35 U.S.C. 154(b) by 328 days.

(21) Appl. No.: 16/348,299

(22) PCT Filed: Nov. 8, 2017

(86) PCT No.: PCT/CA2017/000241
§ 371 (c)(1),
(2) Date: May 8, 2019

(87) PCT Pub. No.: WO2018/085918
PCT Pub. Date: May 17, 2018

(65) Prior Publication Data
US 2019/0276315 A1 Sep. 12, 2019

Related U.S. Application Data

(60) Provisional application No. 62/419,210, filed on Nov. 8, 2016.

(51) Int. Cl.
*C01B 32/15* (2017.01)
*C08J 9/14* (2006.01)
(Continued)

(52) U.S. Cl.
CPC ............ *C01B 32/15* (2017.08); *C01B 32/318* (2017.08); *C04B 35/524* (2013.01);
(Continued)

(58) Field of Classification Search
CPC ........ C01B 32/15; C01B 32/318; C08J 9/142; C08J 9/36; C08J 2203/12; C08J 2333/26;
(Continued)

(56) References Cited

U.S. PATENT DOCUMENTS 3,342,555 A   9/1967  McMillan
6,057,262 A   5/2000  Derbyshire et al.
(Continued)

FOREIGN PATENT DOCUMENTS

JP      H08169780        *  7/1996
WO      2015135080 A1       9/2015
WO      WO-2018093054 A1 *  5/2018   ............... C10L 5/06

OTHER PUBLICATIONS

Kadla, J. F., Kubo, S., Venditti, R. A., Gilbert, R. D., Compere, A. L., Griffith, W., Carbon 2002, 40 (15), 2913-2920.
(Continued)

*Primary Examiner* — Cephia D Toomer
(74) *Attorney, Agent, or Firm* — Eduardo Krupnik

(57) ABSTRACT

The invention relates to a method of preparing sub-micron biocarbon materials using biomass that is chemically modified with organic or inorganic agents including but not limited to acrylamide, glycine, urea, glycerol, bio-glycerol, corn syrup, succinic acid, and sodium bicarbonate. The use of foaming and heating methodologies which could be either pre or post carbonization and subsequent particle size reduc-
(Continued)

L – Lignin and A – Acrylamide tion methodologies for the creation of cost-competitive sub-micron biocarbon particles and fibers for a variety of applications.

22 Claims, 12 Drawing Sheets

(51) Int. Cl.
    *C08J 9/36*     (2006.01)
    *C10B 53/02*     (2006.01)
    *C10B 57/06*     (2006.01)
    *C04B 38/00*     (2006.01)
    *C04B 38/10*     (2006.01)
    *C04B 35/524*     (2006.01)
    *C01B 32/318*     (2017.01)
    *B82Y 40/00*     (2011.01)

(52) U.S. Cl.
    CPC .......... *C04B 38/0022* (2013.01); *C04B 38/10* (2013.01); *C08J 9/142* (2013.01); *C08J 9/36* (2013.01); *C10B 53/02* (2013.01); *C10B 57/06* (2013.01); *B82Y 40/00* (2013.01); *C01P 2004/62* (2013.01); *C01P 2004/64* (2013.01); *C04B 2235/48* (2013.01); *C04B 2235/5454* (2013.01); *C08J 2203/12* (2013.01); *C08J 2333/26* (2013.01); *C08J 2397/02* (2013.01)

(58) Field of Classification Search
    CPC ...... C08J 2397/02; C10B 53/02; C10B 57/06; B82Y 40/00; C01P 2004/64
    See application file for complete search history.

(56) References Cited

U.S. PATENT DOCUMENTS 9,102,801 B1    8/2015   Dirk et al.
2010/0304141 A1   12/2010   Kamegawa et al.

OTHER PUBLICATIONS

Zhao, X., Lu, X., Tze, W. T. Y., Kim, J., Wang, P., ACS Applied Materials & Interfaces 2013, 5(18), 8853-8856.
Snowdon, M. R., Mohanty, A. K., and Misra, M., ACS Sustainable Chemistry & Engineering 2014, 2(5), 1257-1263.
Ioannidou, O. and Zabaniotou, A., Renewable and Sustainable Energy Reviews 2007, 11(9), 1966-2005.
K. Babel, K. Jurewicz, Carbon 2008, 46(14), 1948-1956; Suhas, Gupta, V. K., Carrott, P. J. M., Singh, R., Chaudhary, M., Kushwaha, S., Bioresource Technology 2016, 216, 1066-1076.
Wang, Y., Zhou, J., Jiang, L., Ulven, C., Lubineau, G., Liu, G., Xiao, J., Journal of Polymer Environment 2015, 23, 595-605.
Wang, C., Ma, D., and Bao, X., Journal of Physical Chemistry C 2008, 112 (45), 17596-17602.
International Search Report and Written Opinion from the Canadian Intellectual Property Office for Application No. PCT/CA2017/000241, dated Mar. 28, 2018.

* cited by examiner

95% L+ 5%A    90% L+ 10%A    85% L+ 15%A    80% L+ 20%A

L – Lignin and A – Acrylamide

95% L+ 5%G     90% L+ 10%G     85% L+ 15%G     80% L+ 20%G

L – Lignin and G – Glycine

L – Lignin and G – Glycine

METHODS FOR CREATION OF SUB-MICRON BIOCARBON MATERIALS FROM BIOMASS AND THEIR FIELDS OF APPLICATION

CROSS REFERENCE TO RELATED APPLICATIONS

This application is a national stage application under 35 U.S.C. 371 of International Application No. PCT/CA2017/000241, filed Nov. 8, 2017, which in turn claims the benefit under 35 U.S.C. 119(e) of U.S. Provisional Ser. No. 62/419,210, filed Nov. 8, 2016, the contents of each of which are hereby incorporated by reference into the present disclosure.

FIELD OF THE INVENTION

The present invention relates to the field of using agricultural biomass, woody biomass, and industrial byproducts and organic wastes as low-cost renewable resources for the synthesis of sub-micron biocarbon materials for a variety of applications. The present invention more particularly relates to the production of carbon microparticles, nanoparticles, and nanofibers by foaming-carbonization-milling or carbonization-foaming-milling processes from various types of biomass and organic wastes.

BACKGROUND OF THE INVENTION

Sub-micron and nano-sized carbonaceous materials are extensively used in many commercial applications including composites, coatings, pigments, sensors, catalysts, and energy storage and conversion devices. Conventional synthesis methods are mainly based on the incomplete combustion of heavy petroleum products such as tar and pitch. The processes are energy intensive, costly, and environmentally harmful. A cost-effective and simplified process for producing sub-micron and nano-sized carbonaceous materials from renewable resources therefore makes economic sense and benefits the global mission of sustainable development.

Examples of widely used carbonaceous materials include carbon fibers and carbon black. Carbon fibers are often made from carbon-rich precursor polymers such as polyacrylonitrile (PAN) and rayon. There have been investigations of producing carbon fibers from renewable materials such as lignin and cellulose [Kadla, J. F., Kubo, S., Venditti, R. A., Gilbert, R. D., Compere, A. L., Griffith, W., Carbon 2002, 40 (15), 2913-2920; Zhao, X., Lu, X., Tze, W. T. Y., Kim, J., Wang, P., *ACS Applied Materials & Interfaces* 2013, 5(18), 8853-8856]. Lignin-based carbon fibers are usually produced by first converting lignin to fibers by thermal extrusion, wet spinning, or electrospinning and then subjecting the fibers to controlled carbonization. Natural fibers such as cellulose can be carbonized directly. Carbon black is currently made by the combustion of heavy petroleum products such as tar and used as pigment and fillers in rubber products, especially automobile tires, and plastics. Snowdon, et al. subjected lignin waste from the bioethanol industry through carbonization and milling and evaluated the properties of the obtained material as possible carbon black alternative [Snowdon, M. R., Mohanty, A. K., and Misra, M., *ACS Sustainable Chemistry & Engineering* 2014, 2(5), 1257-1263]. The lignin was carbonized at 600, 750, and 900° C. and then ball milled for different lengths of time. No chemical modification was carried out to help size reduction. The particle size of the carbonized material went below 1 µm after 24 h of milling and increased to about 2 µm again after 48 h of milling. Milling of the biocarbon has been found to have limited ability in reducing the particle size and prolonged milling may cause the particles to "fuse" together.

Another important carbon product is activated carbon, which is a form of carbon processed to have a highly microporous structure that gives the material the characteristic high surface area. There have been investigations in producing activated carbon from agricultural residues, lignin, and cellulose [Ioannidou, O. and Zabaniotou, A., *Renewable and Sustainable Energy Reviews* 2007, 11(9), 1966-2005; K. Babef, K. Jurewicz, Carbon 2008, 46(14), 1948-1956; Suhas, Gupta, V. K., Carrott, P. J. M., Singh, R., Chaudhary, M., Kushwaha, S., *Bioresource Technology* 2016, 216, 1066-1076]. Wang, et al. prepared activated carbon from dried distillers grains with solubles (DDGS) by microwave-assisted chemical activation [Wang, Y., Zhou, J., Jiang, L., Ulven, C., Lubineau, G., Liu, G., Xiao, J., *Journal of Polymer Environment* 2015, 23, 595-605]. Although a porous structure was obtained with increased surface area, a strong mineral acid (85% phosphoric acid) was used as the activation agent and a large amount of the acid, at 1:1 and 2:1 acid/DDGS weight ratios, was needed. In a different study, porous carbon nanostructures were prepared from filter paper, cotton, and wood by microwave assisted pyrolysis of iron-doped polypyrrole/biomass composites [Wang, C., Ma, D., and Bao, X., *Journal of Physical Chemistry C* 2008, 112 (45), 17596-17602]. The iron impregnated in the biomass catalyzed the polymerization of pyrrole on the biomass to form the Fe/polypyrrole/biomass composites. In the subsequent microwave treatment, the conductive polypyrrole helped to absorb the microwave irradiation and the Fe also accelerated the pyrolysis. The method involves lengthy doping and polymerization processes.

A number of patents and patent applications have disclosed methods for making carbon particles from biomass.

U.S. Pat. No. 6,057,262 describes a method for producing high-surface-area activated carbon from biomass. The biomass is mixed with the processing agent and/or activation agent and preheated to a temperature between 70-200° C. This is followed by heating at 350-650° C. for a period of 30-120 minutes. The processing agent includes natural and synthetic monomers, oligomers, polymers and their mixtures. The activation agent includes mineral acids such as phosphoric acid, organic acids such as benzoic acid, and metal chlorides such as zinc chloride. The method uses a large amount of the activation agent (for example, at 1:2 and 1:4 weight ratio to biomass) to produce a carbon material with high internal surface area.

U.S. Pat. No. 9,102,801B1 discloses a method for mechanically reducing the particle size of lignin to less than 40 nanometers by ball milling. The raw material used in the examples was lignosulfonate. The method is only for producing nanoparticles from lignin. There is no carbonization involved in the process, but rather reacting lignin particles to a radical form of a diazonium precursor during or after mechanically reducing the particle size.

The patent application WO2015135080A1 describes a master batch comprising biocarbon and a carrier resin, which can be petroleum-based polymers such as polypropylene (PP), polyethylene (PE) and biobased polymers such as poly(lactic acid) (PLA), and a method for producing the master batch by producing the biocarbon from biomass by pyrolysis, milling, and mixing the biocarbon with the carrier resin by extrusion. The master batch contains 25 to 75% biocarbon and is proposed as an alternative to carbon black master batches.

U.S. Pat. No. 9,321,649B2 and US2010/0304141A1 disclose a method for producing hollow carbon particles from lignin. A solution of lignin and a basic compound such as sodium hydroxide is spray dried to convert the microdroplets formed during spraying into microparticles. The microparticles are heated in a range of 300 to 1200° C. to produce hollow carbon microparticle. The spray drying process produces the small particles and the inorganic substances impregnated helps to create the large specific surface area, which is claimed to be equivalent to that of the activated charcoal.

Direct carbonization of biomass results in structures still resembling those of the original plant cell wall. As previously stated, milling of the biocarbon has limited ability in reducing the particle size and may even cause agglomeration after long milling time. Solution-based size reduction is limited to materials that have been chemically modified to be soluble in a particular solvent. Chemical activation involves impregnating the raw material with strong acids, strong bases, or salts, often at high concentrations, before carbonization. The present invention uses milder organic additives such as glycerol, urea, and corn syrup in a method that uses porous intermediates to eliminate the need for harsh chemical agents, such as strong mineral acids, and help to create small particle sizes.

SUMMARY OF THE INVENTION

The present invention relates to a novel method for the preparation of carbon sub-micron and nano-materials from various types of agricultural and woody biomass including, but not limited to, miscanthus, switchgrass, coconut shell fibers, wood chips, and saw dust and industrial byproducts and organic wastes including, but not limited to, lignin and coffee chaff. The invention involves using initiators including, but not limited to, glycerol, urea, acrylamide, sodium bicarbonate, succinic acid, and corn syrup to form foamy intermediates of the biomass, heating the initiated biomass before or after carbonization in pyrolyzers or augers, and then further reducing the particle size through grinding and milling.

The method described allows the treatment of raw biomass or industrial by-products such as lignin type materials to be treated with foaming agents, foamed at relatively low temperatures (for example of around 180° C.), which are further subjected to pyrolysis (in this process, materials are foamed prior to pyrolysis). But also, due to its nature, these lignin type materials can be foamed and pyrolyzed in a single processing step. This means that the raw material is treated with the foaming agents and placed directly in the pyrolyzer where it will be foamed and pyrolyzed in a single step. This is possible, since the pyrolyzer allows for the temperature transitions for both foaming and pyrolysis. In both cases the obtained porous material is subjected to particle reduction by mechanical work.

Other materials such as grasses or wood derived products or the like are carbonized in a first step at the pyrolysis temperatures, and then the biocarbon obtained is treated with foaming agents, foamed at relatively low temperatures (for example of around 180° C.) to obtain a porous material, and then followed by particle reduction of the porous material by mechanical work.

In one embodiment, the present invention provides for a method for producing biobased sub-micron biocarbon materials, said method including: (a) forming a porous intermediate structure by either (i) mixing raw biomass with a foaming agent and carbonizing the mixture, or (ii) mixing carbonized and ground biomass with the foaming agent; and (b) size reducing the porous intermediate structure to an average particle size less than about 1,000 nanometers, thereby producing the biobased sub-micron biocarbon materials.

In one embodiment of the method for producing biobased sub-micron biocarbon materials, the porous intermediate structure is formed by: (a) obtaining a substantially homogenous dispersion in a solvent comprising the foaming agent and the raw biomass or the carbonized and ground biomass; (b) heating the obtained dispersion under stirring to form a viscous resin; and (c) heating the viscous resin to form the porous intermediate structure In another embodiment of the method for producing biobased sub-micron biocarbon materials, the size reducing step comprises milling the porous intermediate to the average particle size less than about 1,000 nm to produce the sub-micron biocarbon materials.

In another embodiment of the method for producing biobased sub-micron biocarbon materials, the biomass is selected from the group consisting of agricultural biomass, woody biomass, and industrial byproducts and organic wastes.

In another embodiment of the method for producing biobased sub-micron biocarbon materials, the homogenous dispersion is either a solution in the case of water-soluble biomass or a suspension for other types of biomass.

In another embodiment of the method for producing biobased sub-micron biocarbon materials, the foaming agent is one or more organic polyol, one or more organic nitrogen-containing compound, or a mixture thereof.

In another embodiment of the method for producing biobased sub-micron biocarbon materials, the one or more organic polyol is derived from natural sources.

In another embodiment of the method for producing biobased sub-micron biocarbon materials, the one or more organic polyol is selected from the group consisting of glycerol, glycerol derivatives, glycols, sugar alcohols, sugar acids, carbohydrate, syrup, and mixtures of two or more polyols thereof.

In another embodiment of the method for producing biobased sub-micron biocarbon materials, the one or more organic polyol is selected from the group consisting of glycerol, propylene glycol, trimethylene glycol, allose, altrose, glucose, mannose, gulose, idose, galactose, talose, ribose, arabinose, xylose, lyxose, threose, erythrose, sorbose, fructose, dextrose, levulose, sorbitol, sucrose, maltose, cellobiose and lactose, and a mixture of two or more polyols thereof.

In another embodiment of the method for producing biobased sub-micron biocarbon materials, the one or more organic polyol is glycerol or bio-glycerol.

In another embodiment of the method for producing biobased sub-micron biocarbon materials, the one or more organic polyol is obtained as by-products from another process and is used directly without further purification.

In another embodiment of the method for producing biobased sub-micron biocarbon materials, the one or more organic nitrogen-containing compound is selected from the group consisting of amines, urea, amides, imines, imides, azides, nitriles, and a mixture of two or more organic nitrogen-containing compounds thereof.

In another embodiment of the method for producing biobased sub-micron biocarbon materials, the one or more organic nitrogen-containing compound is acrylamide, glycine, urea, or a mixture of two or more organic nitrogen-containing compounds thereof.

In another embodiment of the method for producing biobased sub-micron biocarbon materials, the one or more nitrogen-containing compound is obtained as by-products from another process and is used directly without further purification.

In another embodiment of the method for producing biobased sub-micron biocarbon materials, the ratio of biomass:foaming agent (wt. %:wt. %) in the substantially homogenous dispersion is between 99:1 to 50:50 or any range there in between.

In another embodiment of the method for producing biobased sub-micron biocarbon materials, the one or more foaming agent is glycerol and the weight ratio of biomass:glycerol is between 95:5 to 80:20 or any range there in between.

In another embodiment of the method for producing biobased sub-micron biocarbon materials, the one or more foaming agent is acrylamide and the weight ratio of biomass:acrylamide is between 95:5 to 80:20 or any range there in between.

In another embodiment of the method for producing biobased sub-micron biocarbon materials, the weight ratio of biomass:acrylamide is about 85:15 or about 80:20 and the sub-micron biocarbon materials are in the form of uniform spherical particles.

In another embodiment of the method for producing biobased sub-micron biocarbon materials, the one or more organic or inorganic foaming agents is glycine and the weight ratio of biomass:glycine is between 95:5 to 80:20 or any range there in between.

In another embodiment of the method for producing biobased sub-micron biocarbon materials, the one or more foaming agent is urea and the weight ratio of biomass:urea is between 97:3 to 80:20 or any range there in between.

In another embodiment of the method for producing biobased sub-micron biocarbon materials, the weight ratio of biomass:urea is about 97:3 and the sub-micron biocarbon materials obtained are in the form of nanofibers.

In another embodiment of the method for producing biobased sub-micron biocarbon materials, the solvent used is water.

In another embodiment of the method for producing biobased sub-micron biocarbon materials, step (b) comprises heating the dispersion under stirring at a temperature of about 80° C. to about 200° C. for about 1 hour to about 24 hours.

In another embodiment of the method for producing biobased sub-micron biocarbon materials, step (c) comprises heating the viscous resin at a temperature of about 140° C. to about 200° C., for about 10 hours to about 15 hours, to obtain the porous intermediate structure.

In another embodiment of the method for producing biobased sub-micron biocarbon materials, the porous intermediate is further heated in an inert atmosphere at a temperature of about 400° C. to about 900° C. for about 1 hour to about 12 hours.

In another embodiment of the method for producing biobased sub-micron biocarbon materials, the at least one foaming agent is glycerol, bio-glycerol, urea, acrylamide, corn syrup, sodium bicarbonate, and succinic acid.

In another embodiment of the method for producing biobased sub-micron biocarbon materials, the forming of the porous intermediate structure is carried out in a conventional oven.

In another embodiment of the method for producing biobased sub-micron biocarbon materials, the forming of the porous intermediate structure is carried out in a heated auger.

In another embodiment of the method for producing biobased sub-micron biocarbon materials, the forming of the porous intermediate structure is carried out in a microwave oven.

In another embodiment of the method for producing biobased sub-micron biocarbon materials, the milling of the porous intermediate is carried out in a planetary ball mill with different milling media.

In another embodiment of the method for producing biobased sub-micron biocarbon materials, the milling of the porous intermediate is carried out in a wet or dry particle size reduction process.

In another embodiment of the method for producing biobased sub-micron biocarbon materials, the milling of the porous intermediate is carried out in a jet mill using compressed air, inert gas, steam, or other media.

In another embodiment of the method for producing biobased sub-micron biocarbon materials, the at least one foaming agent is organic or inorganic.

In another embodiment of the method for producing biobased sub-micron biocarbon materials, the average particle size is smaller than 500 nm.

In another embodiment of the method for producing biobased sub-micron biocarbon materials, the average particle size is smaller than 100 nm.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

FIG. 3A: 100% lignin (L). FIG. 3B: 95% L and 4% Acrylamide (A). FIG. 3C 90% L and 10% A. FIG. 3D: 85% L and 15% A. FIG. 3E: 80% L and 20% A.

L 85%/CG 15% and L 80%/CG 20%).

Figure 6:
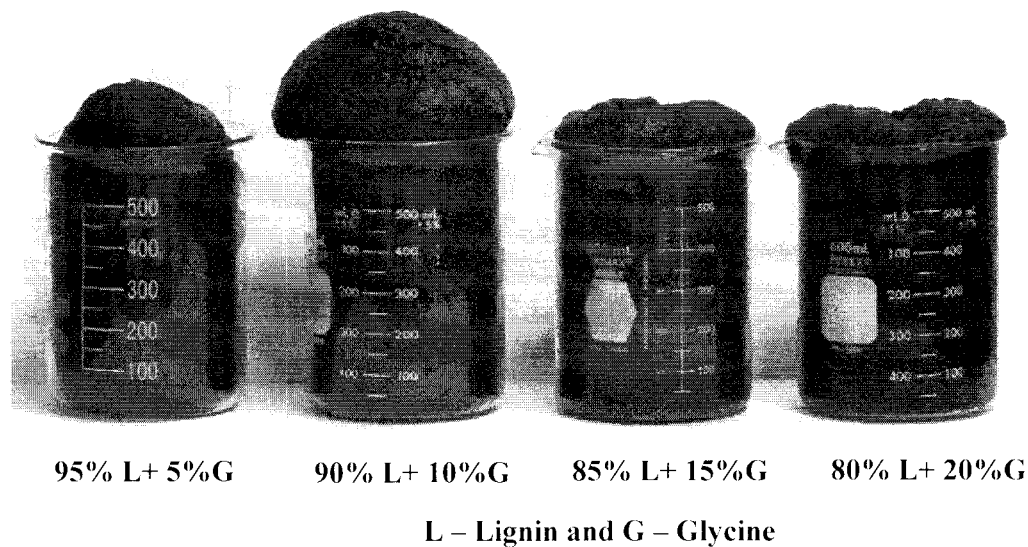

FIG. 6 shows a photograph of the intermediates with various lignin (L)-glycine (G) formulations.

Figure 7:
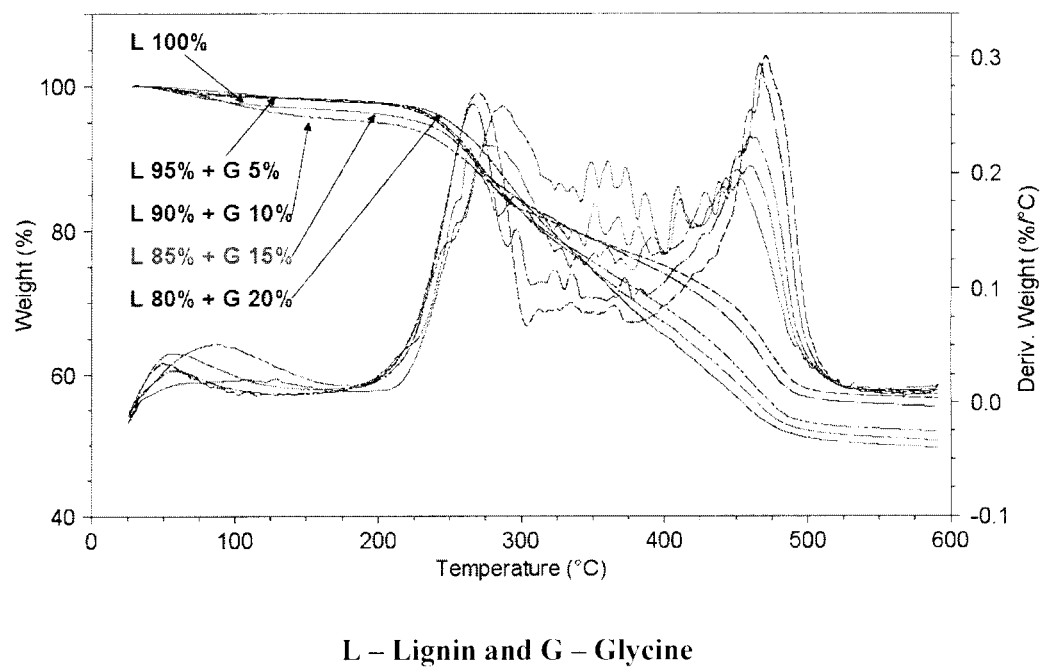

FIG. 7 shows the TGA curves of the intermediates from various lignin (L)-glycine (G) formulations.

Figure 8A:
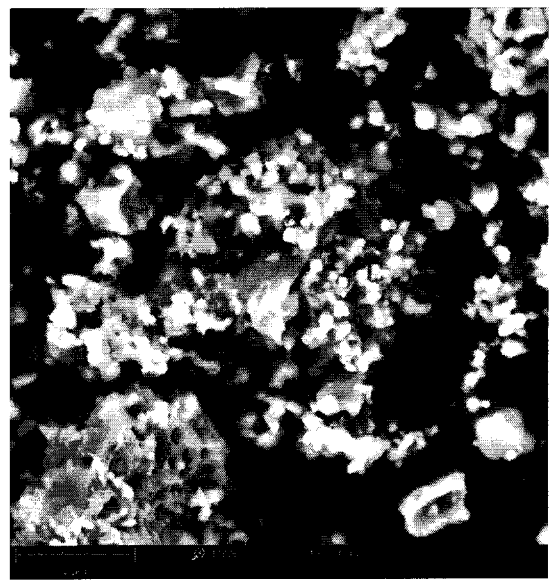

FIGS. 8A (5 µm scale bar) and 8B (3 µm scale bar) show the SEM images of the carbonized intermediate of the lignin-urea formulation.

FIGS. 9A to 9D show the SEM images of the nanofibers produced by the carbonization and milling the lignin-urea intermediate. The sample in FIGS. 9A (5 µm scale bar) and 9B (3 µm scale bar) was ball milled 12 h and the sample in FIGS. 9C (5 µm scale bar) and 9D (3 µm scale bar) was ball milled 24 h.

Figure 10:
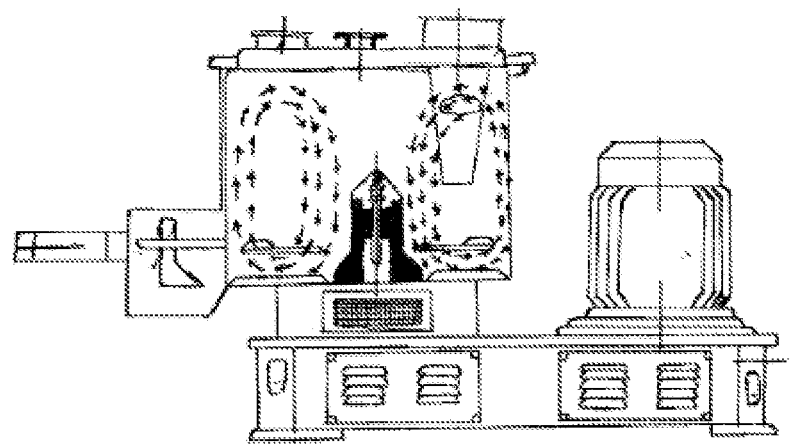
Figure 11:
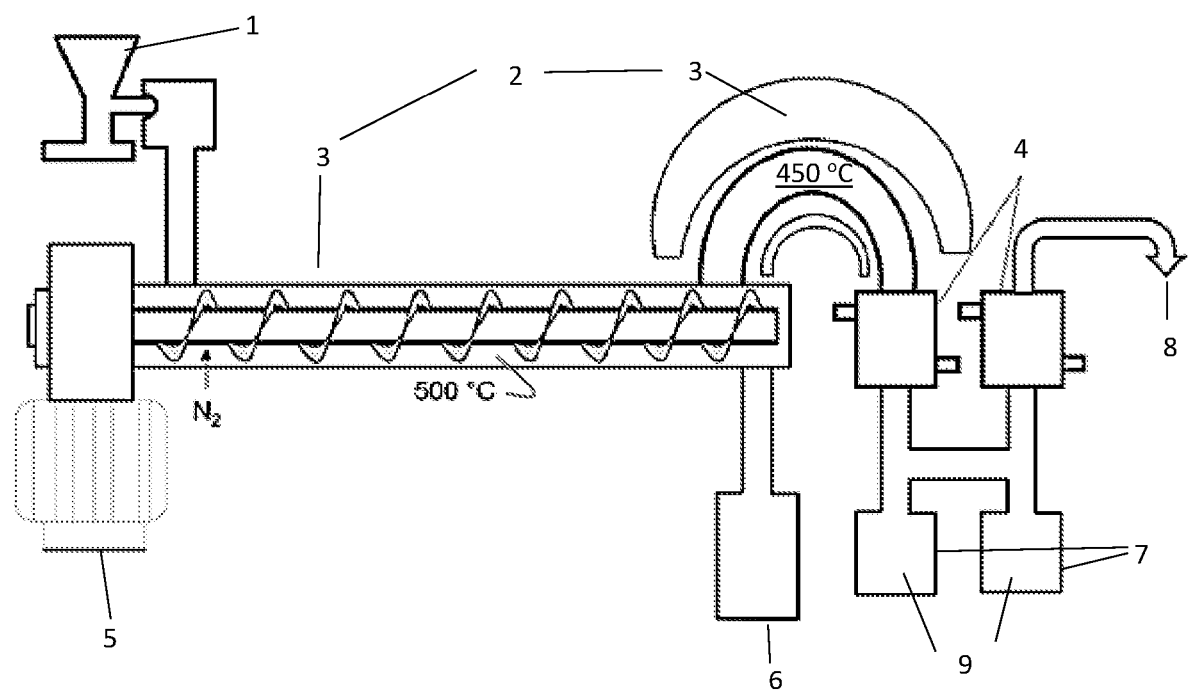

FIG. 10 is a schematic of the high-intensity mixer used for mixing the foaming agents FIG. 11 is the set-up of the auger system for the carbonization and, in some embodiments, the foaming of the biomass. Reference numbers: weight loss feeder 1; temperature controllers 2; heater bands 3; chilled water condensers 4; motor drive and controller 5; biochar 6; bio-oil collection jars 7; gas 8; bio-oil 9.

Figure 12:
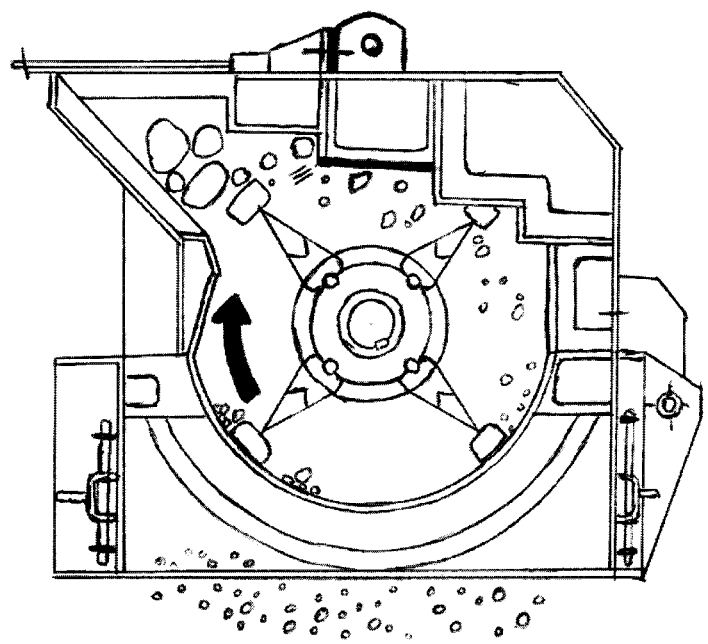

FIG. 12 is a schematic of the hammer mill.

Figure 13A:
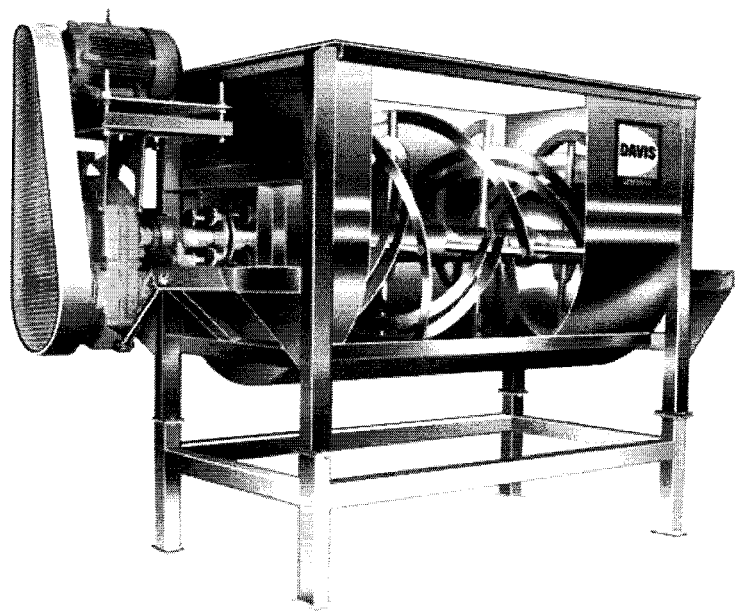
Figure 13B:
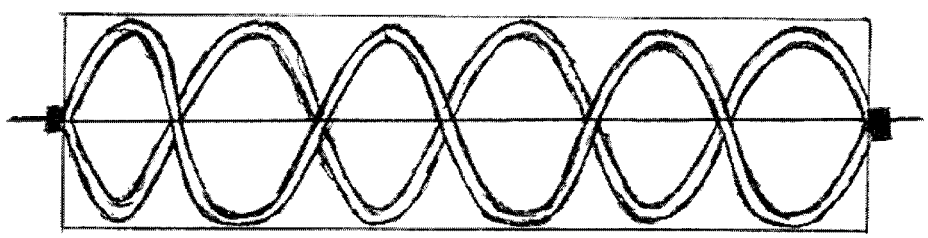

FIGS. 13A and 13B are the picture (FIG. 13A) and illustration (FIG. 13B) of the ribbon element of the ribbon blender used for mixing the carbonized biomass with the organic additives.

Figure 14:
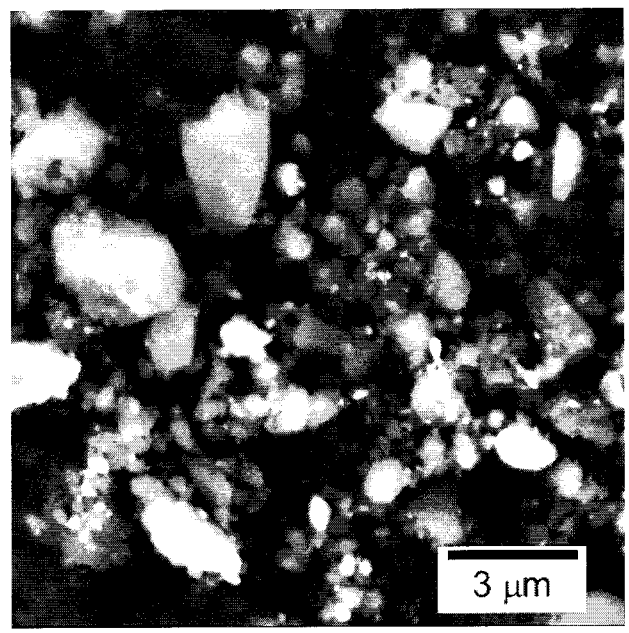

FIG. 14 shows the typical SEM image of the carbon particles produced in Example 6.

Figure 15A:
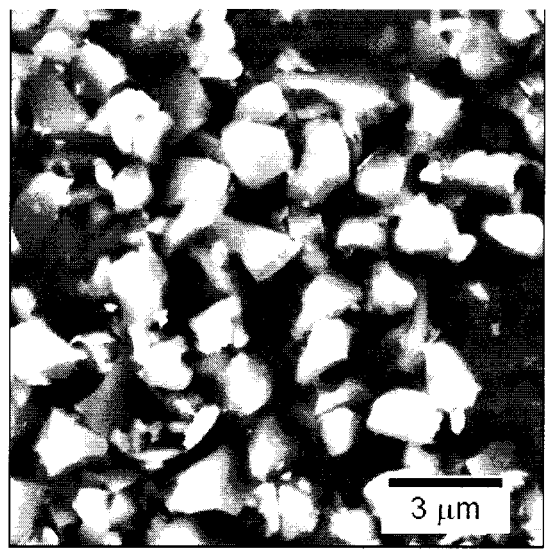
Figure 15B:
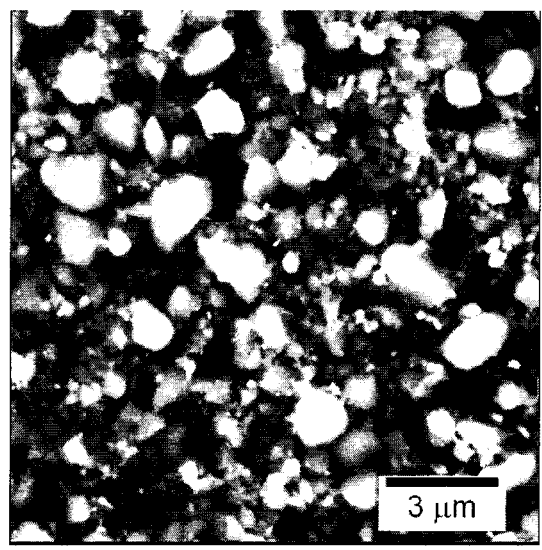

FIGS. 15A and 15B show the typical SEM image of the carbon particles produced after jet milling (FIG. 15A; 3 µm scale bar) and after both jet milling and ball milling (FIG. 15B; 3 µm scale bar) in Example 9.

DETAILED DESCRIPTION OF THE INVENTION (i) Definitions

The following definitions, unless otherwise stated, apply to all aspects and embodiments of the present application.

The term "biomass" as used herein is used to describe various types of agricultural biomass such as miscanthus, switchgrass, straws, and stalks, woody biomass such as wood chips and sawdust, industrial byproducts and organic wastes such as lignin and coffee chaff.

The term "biomass hybrid" as used herein refers to a mixture of two or more different types of biomass.

The term "lignin" as used herein refers to any form of this complex biopolymer derived from plant. Lignin is most abundantly found in the cell walls of vascular plants and some algae.

The term "organic additive" as used herein refers to hydrocarbon-based compounds that can also contain oxygen, nitrogen, and/or sulfur.

The term "carbonization" or "carbonizing" as used herein refers to the conversion of an organic material into carbon or a carbon-rich residue through pyrolysis, which is the decomposition of a material or compound being heated in the absence of oxygen or any other reactive gases.

The term "suitable" as used herein means that the selection of the particular compound, group, atom or conditions would depend on the specific synthetic manipulation to be performed, and the nature of the molecule(s) to be transformed, but the selection would be well within the skill of a person trained in the art. All the synthetic steps described herein are to be conducted under conditions sufficient to provide the product shown. Synthetic is used to describe that all steps are induced or they are deliberate and do not occur in natural circumstances. Unless otherwise indicated, a person skilled in the art would understand that all reaction conditions, including, for example, reaction solvent, reaction time, reaction temperature, reaction pressure, reactant ratio, and whether or not the reaction should be performed under an anhydrous or inert atmosphere, can be varied to optimize the yield of the desired product and it is within their skill to do so.

The products of the processes of the application may be isolated by evaporation of the solvent, by filtration, centrifugation, chromatography or other suitable methods.

While a reaction step of the present application is carried out in a variety of solvents or solvent systems, said reaction step may also be carried out in a mixture of the suitable solvents or solvent systems.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

Submicron biocarbon (also referred to in this document as "biobased sub-micron carbonaceous materials" or "sub-micron materials and so forth): biocarbon particles smaller than about 1,000 nm, preferably smaller than 500 nm, more preferably particles smaller than 100 nm. Submicron particles include particles in the size range of from about 1 nm to about 1,000 nm.

(ii) Materials

Biomass used herein includes agricultural biomass and residue, woody biomass, and industrial byproducts and organic wastes (a-c below).

(a) Agricultural Biomass

Agricultural biomass that can be used in the present invention includes grasses such as miscanthus and switchgrass and agricultural residues such as straws and stalks. The biomass used in the examples of this invention is miscanthus grass in field produced and provided by Competitive Green Technologies (Leamington ON, Canada)

(b) Woody Biomass

Woody biomass that can be used in the present invention includes wood chips and sawdust.

(c) Industrial Byproducts and Organic Wastes

Industrial byproducts and organic wastes include the waste organic materials produced as low-value byproduct of various industrial sectors.

Lignin is a class of phenolic polymers, which are important structural components of vascular plants and some algae. Lignin found in the plant cell wall is linked to polysaccharides such as hemicellulose and cellulose to form a composite structure to provide mechanical strength to the cell wall. Lignin is insoluble in water and plays an essential role in conducting water in vascular plant. Lignin is the major byproduct of paper manufacturing. Lignin removed from the popular Kraft pulping process is called Kraft lignin and is usually burned as a fuel. Lignin obtained from sulfite pulping is sulfonated lignin. Lignosulfonates are soluble in water. Lignin used in the examples of the invention may be the Polybind sodium lignosulfonate supplied by Northway Lignin Chemical (Ontario, Canada) or Kraft lignin provided by Competitive Green Technologies (Ontario, Canada).

Coffee chaff is one of the major organic wastes generated during the production of coffee. Coffee beans are separated from coffee cherries, dried, and roasted. The innermost skin of the coffee beans floats free during roasting and often referred to as coffee chaff in the coffee industry. As coffee is one of the most widely consumed beverages in the world, coffee chaff is an important industrial waste. Coffee chaff used in the examples of the invention was provided by Competitive Green Technologies (Ontario, Canada).

(d) Organic and Inorganic Additives (Including Foaming Agents)

The present application contemplates the use of organic or inorganic additives, including organic or inorganic foaming agents.

Glycerol, the simplest triol, is non-toxic and widely used in the food and pharmaceutical industries. Crude glycerol is the byproduct of biodiesel production. With the sharp increase in the global biofuel production, crude glycerol is available in large supply quantities and currently mainly disposed of as waste. The crude glycerol used in the examples of the invention may be obtained from Methes Energies International Ltd. (Ontario, Canada).

Acrylamide is an organic compound soluble in water and ethanol. Acrylamide can go through thermal decomposition to release carbon monoxide, carbon dioxide, and nitrogen oxides.

Urea is an organic compound of two —NH2 groups joined by a carbonyl (C=O) functional group. Urea is a color-less solid highly soluble in water. Urea is an important metabolic compound in the animal and human body. Synthetic urea is the widely used as a nitrogen-releasing fertilizer around the world.

Glycine is the smallest possible amino acid, with hydrogen as its side chain. Glycine occurs as a color-less crystalline solid soluble in water.

(e) Polymers

The sub-micron carbonaceous materials can be combined with different polymers to produce composites. These polymers include petroleum-based polymers such as polypropylene, polyethylene, and poly(ethylene terephthalate) (PET), etc. as well as biobased and/or biodegradable polymers such as poly(lactic acid) (PLA), polyhydroxyalkanoates (PHAs), polycaprolactone (PCL), poly(butylene adipate-co-terephthalate) (PBAT), poly(butylene succinate) (PBS), etc.

(iii) Methods

The present application relates to a method of preparing carbon sub-micron and nano-materials from biomass by creating foamy or porous intermediates before or after the carbonization process through the use of various organic additives.

Accordingly, the present application includes a method of preparing carbon sub-micron and nano-materials or nano-particles. The method herein described may include one or a combination of the following processes: a) foaming of the raw materials followed by carbonization and particle reduction, b) foaming and carbonization in a single step followed by particle reduction, and c) carbonization followed by foaming and further particle reduction. As explained herein in this this invention, the foaming is achieved through the use of organic additives which are dissolved in the respective solvent. The solvent can be water if the additive or additives are soluble in water.

When biomass includes or is lignin, the lignin may be water-insoluble lignin, water-soluble lignin, or lignin that is soluble in other solvents. In some embodiments of the application, the lignin is water-soluble sodium lignosulfonate. In some other embodiments of the application, the lignin is water-insoluble Kraft lignin.

In an embodiment of the application, the additive or combination of additives used and the ratio of biomass:additive(s) determine the morphology and/or size of the resulting carbon sub-micron and nano-materials. Accordingly, the method of the application further includes modifying the morphology of the carbon sub-micron and nano-materials by selection of the one or more organic additives and the ratio of biomass:additive(s).

In an embodiment, the one or more organic additives are an organic polyol or an organic nitrogen-containing compound.

The organic polyol is any hydrocarbon-based compound comprising two or more hydroxyl groups. The polyol may be derived from natural sources. Particular examples of suitable organic polyols include, but are not limited to, glycerol, glycerol derivatives, glycols, sugar alcohols, sugar acids and saccharides (also known as carbohydrates or sugars), and mixtures thereof. In an embodiment of the application, the organic polyol is selected from glycerol, propylene glycol, trimethylene glycol, allose, altrose, glucose, mannose, gulose, idose, galactose, talose, ribose, arabinose, xylose, lyxose, threose, erythrose, sorbose, fructose, dextrose, levulose, sorbitol, sucrose, maltose, cellobiose and lactose, and mixtures thereof. In an embodiment, the organic polyol is glycerol. In a particular embodiment, the organic polyol is obtained as a by-product from another process and/or is used directly from its source without further purification.

The organic nitrogen-containing compound is any hydrocarbon-based compound comprising nitrogen. In an embodiment, the organic nitrogen-containing compound comprises one or more amines, ureas, amides, imines, imides, azides or nitriles, or a mixture thereof. In a particular embodiment, the organic nitrogen-containing compound comprises an amide, amine or a urea, or a mixture thereof. In another embodiment, the organic nitrogen-containing compound is acrylamide, glycine or urea, or an analog or derivative thereof or a mixture thereof. In another embodiment, the organic nitrogen-containing compound is selected from any of the naturally occurring amino acids, urea, thiourea and acrylamide, and salts thereof and mixtures thereof. In a particular embodiment, the nitrogen-containing compound is obtained as a by-product from another process and/or is used directly from its source without further purification.

In an embodiment, the ratio of biomass:additive(s) (wt %:wt %) in the substantially homogenous solution is 99:1 to 50:50 or any range in between. In an embodiment, the ratio of biomass:additive(s) (wt %:wt %) is 98:2 to 60:40, 97:3 to 70:30, 97:4 to 75:25, or, 95:5 to 80:20. It is a further embodiment that the identity of the one or more additives and the ratio of biomass:additive(s) determines the morphology of the resulting carbon nano-materials. While not wishing to be limited by theory, the addition of various organic additives to the biomass not only helps to modify the biomass but also influences the physiochemical properties of the porous intermediate structure, in particular its morphology. During the carbonization process the carbon atoms in the biomass intermediates with different morphology, porosity and thermal degradability (which can be related to their surface area), undergo different stacking mechanisms resulting in the formation various carbon nanostructures. Intermediate structures with a highly porous and foamy microstructure will have a greater surface area, requiring less energy intake for carbonization, thus allowing the use of a carbonization temperature as low as about 600° C. or below. Further, the presence of amide additives is associated with the rapid release of gaseous volatiles during carbonization which results in smaller particle sizes, for example by inhibiting carbon nucleation. Accordingly, the method of the application further includes modifying the morphology of the carbon sub-micron and nano-materials by selection of the one or more organic additives and the ratio of biomass: additive.

As explained herein in an embodiment of the application, the one or more organic additives includes or is glycerol. The glycerol may be crude glycerol. By crude glycerol, it is meant, glycerol obtained as a byproduct from another process or reaction, or from another source, that is used as is, without purification. In a further embodiment, the weight ratio of biomass to glycerol is 95:5 to 80:20 or any range in between. In a further embodiment, the weight ratio of biomass to glycerol is about 85:15 or about 80:20 and the carbon nano-materials obtained using the method of the application are in the form of porous/foamy nanostructures.

In an embodiment of the application, the one or more organic additives includes or is acrylamide. In a further embodiment, the weight ratio of lignin to acrylamide is 95:5 to 80:20 or any range in between. In a further embodiment, the weight ratio of lignin to acrylamide is about 85:15 or about 80:20 and the carbon nano-materials obtained using the method of the application are in the form of uniform spherical carbon nanostructures.

In an embodiment of the application, the one or more organic additives includes or is glycine. In a further embodiment, the weight ratio of lignin to glycine is from 95:5 to 80:20 or any range in between. In a further embodiment, the weight ratio of lignin to glycine is about 85:15 and the carbon nano-materials obtained using the method of the application are in the form of well dispersed fine carbon platelets.

In an embodiment of the application, the one or more organic additives is urea. In a particular embodiment, the weight ratio of lignin:urea is 97:3 to 80:20 or any range in between.

In an embodiment of the present application, the method of preparing carbon sub-micron and nano-materials comprises two heating steps. The first heating step comprises heating the mixture of the biomass and additive(s) to form a porous solid intermediate. The conditions to form a porous solid intermediate will vary depending on the solvent and nature of the biomass and additive(s). The conditions generally comprise heating, with agitation, at an appropriate temperature for some time to remove the solvent (i.e. to make the material dry) and form a porous foamy solid mass. In an embodiment, the conditions to form a porous solid intermediate comprise heating the solution comprising the biomass and additive(s) at a temperature of about 80° C. to about 200° C. for about 3 hours to about 24 hours. The temperature may be adjusted during the drying process. For example, the temperature may be increased, and any agitation stopped, once most of the solvent is removed (for example when a viscous resin is obtained) to effect further drying and formation of the porous solid intermediate. In an embodiment, when the solvent is water, the solution comprising the biomass and additive(s) is heated with stirring at a temperature of about 80 to 100° C., for about 4 hours to about 7 hours, to obtain a viscous resin, which is then heated at a temperature of about 140 to 175° C., for about 10 hours to about 15 hours, to obtain the porous solid intermediate.

In the second heating step, the porous solid intermediate is heated under conditions to form carbon sub-micron and nano-materials. In an embodiment, the conditions to form carbon nano-materials comprise heating in an inert atmosphere, for example, under argon or nitrogen, at a temperature of about 400° C. to about 800° C. for about 1 hour to 12 hours. Again, the temperature may be adjusted during this step. For example, the temperature may be increased after carbon nano-materials are formed (carbonization) to further stabilize or cure the nano-materials. In an embodiment, the porous solid intermediate is heated at a temperature of about 400 to 500° C., for about 1 hour to 6 hours, followed by heating to a temperature of about 600 to 800° C., for about 1 hour to 6 hours.

In an embodiment, the carbon sub-micron and nano-materials are cleaned in order to remove any metal and metal oxide impurities. The methods include treating the newly synthesized carbon nanoparticles with nitric acid ($HNO_3$), sulfuric acid ($H_2SO_4$), and their mixtures.

As explained herein, the methods to produce sub-micron and nano-particles may include the use of mechanical devices to induce the separation of the particles. Methods to achieve particle disgregation/separation may include jet milling or ball milling, particular methods include the milling media variations and technical conditions variations inherent to these instruments. However, an industrial type device designed for this specific purposes is described in patent WO2015135080 also found as CA 2,945,688 and US Pat. Appl. Publ. No. 20170107334.

(iv) Applications

The present invention includes the uses of the sub-micron carbonaceous materials prepared using the methods described herein. The applications may include but are not limited to composites, sensors, catalysis, and components in energy storage/conversion devices.

EXAMPLES

The following examples are set forth to aid in the understanding of the invention. They are not intended and should not be construed to limit in any way the application set forth in the claims which follow thereafter.

Example 1: Synthesis of Carbon Nanoparticles from Lignin Modified with Acrylamide Desired amounts of sodium lignosulfonate (L) and acrylamide (A) (95 wt. % L and 5 wt. % A; 90 wt. % L and 10 wt. % A; 85 wt. % L and 15 wt. % A; and 80 wt. % L and 20 wt. % A) were dissolved in distilled water (solvent), under continuous stirring. The resulting dark brown solution was then concentrated at 90° C. under constant stirring for 6 hours, resulting in the formation of a black colored highly viscous resin. A porous solid mass, referred to as the intermediate, was obtained by drying this highly viscous resin in a hot-air oven at 150° C. for 12 hours. The carbonization of the intermediate was then carried out in nitrogen atmosphere at different temperatures, 450, 600 and 750° C., to yield different nanostructures.

Figure 1:
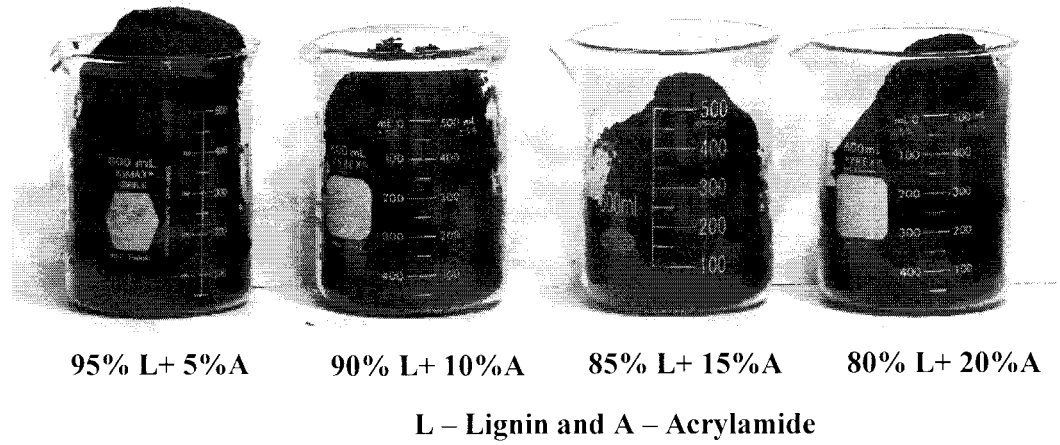
FIG. 1 is a photograph of the intermediates obtained with various lignin (L)-acrylamide (A) formulations.
Figure 2:
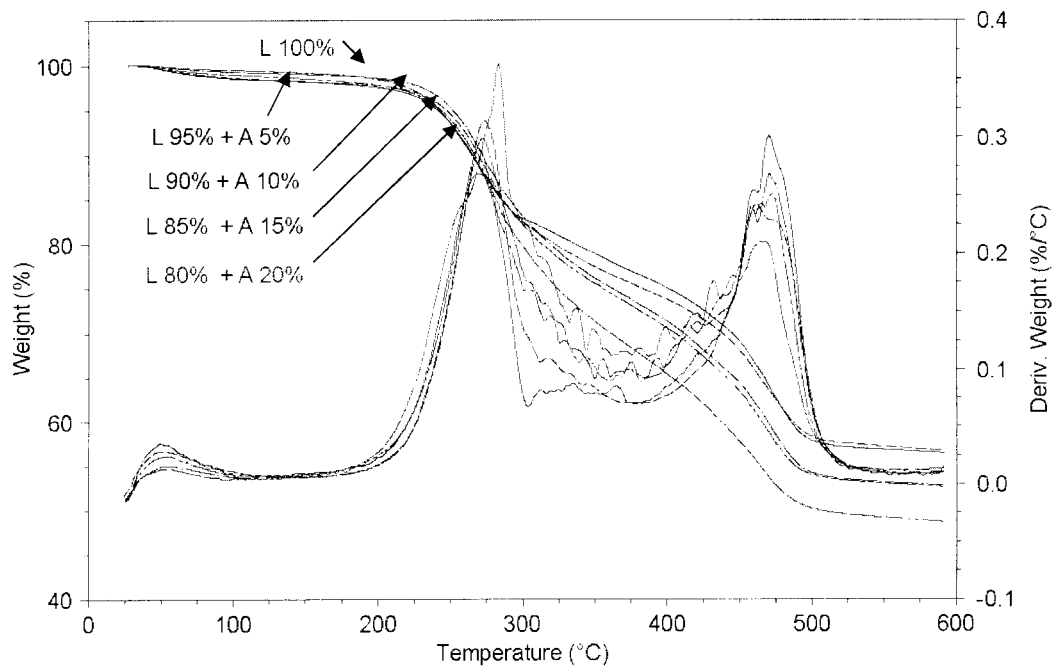
FIG. 2 shows the TGA curves of the intermediates obtained with various lignin-acrylamide formulations.

A photograph of the intermediates is shown in FIG. 1. The intermediate with 5% acrylamide exhibited a larger volume than the other intermediates. Thermogravimetric analysis (TGA) of the intermediates was performed (FIG. 2). It was found that the addition of acrylamide to the lignin slightly decreased the onset temperature of thermal degradation. The weight of the residue left over above 500° C. was also reduced, indicating more volatiles contained in the intermediates.

Figure 3A:
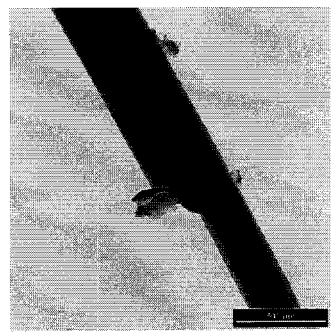
FIGS. 3A to 3E show the TEM images of the synthesized carbon particles at 600° C. from various lignin-arcylamide formulations.
Figure 3B:
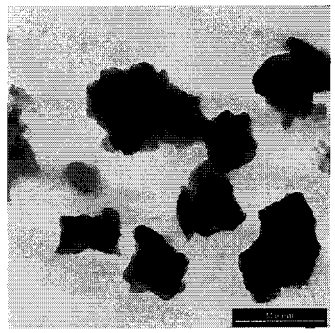
Figure 3C:
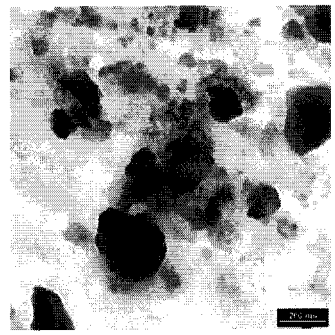
Figure 3D:
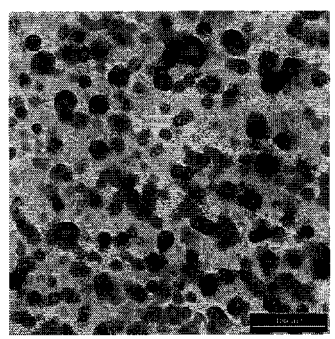
Figure 3E:
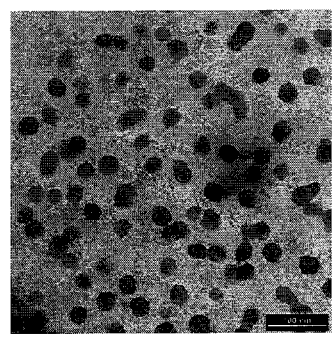

Transmission electron microscopy (TEM) analysis was performed on the synthesised carbon nanoparticles obtained from a series of lignin-acrylamide formulations carbonized at ~600° C. for 6 hours (FIGS. 3A to 3E). A decrease of particle size with increasing acrylamide concentration is observed. The carbonized lignin showed large particle sizes (FIG. 3A). Platelets with sizes between 100-500 nm were obtained from the lowest acrylamide concentration, 5% (FIG. 3B). Adding higher concentration of acrylamide resulted in the formation of very fine particles. Spherical particles with a uniform size of 25 nm were observed at acrylamide concentrations of 15 (FIG. 3D) and 20% (FIG. 3E).

Example 2: Synthesis of Biocarbon from Lignin Modified with Crude Glycerol

Desired amounts of sodium lignosulfonate (L) and crude glycerol (CG) (95 wt. % L and 5 wt. % CG; 90 wt. % L and 10 wt. % CG; 85 wt. % L and 15 wt. % CG; and 80 wt. % L and 20 wt. % CG) were dissolved in distilled water and concentrated at 90° C. under constant stirring for 6 hours. The black colored highly viscous resin obtained was further dried at 150° C. for 12 hours to yield a porous solid mass referred to as the intermediate. The intermediates were carbonized at different temperatures, 450, 600 and 750° C.

Figure 4:
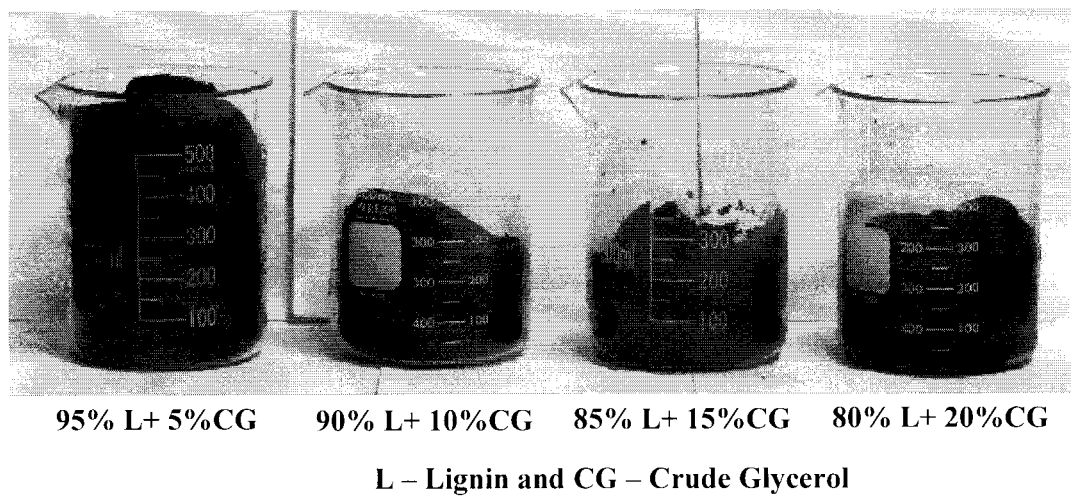
FIG. 4 shows a photograph of the lignin (L) intermediates modified with various crude glycerol (CG) concentrations.
Figure 5:
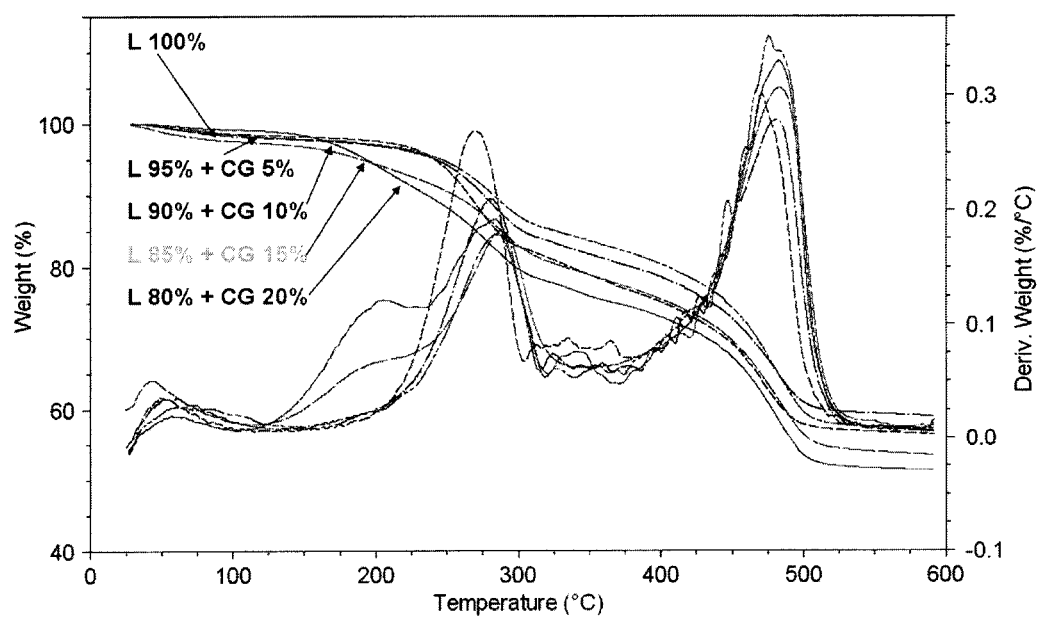
FIG. 5 shows the TGA curves of the intermediates from various lignin (L) and crude glycerol (CG) formulations: L 95%/CG 5%; L 90%/CG 10%.

The intermediate prepared with 5% crude glycerol showed the highest volume of expansion after drying (FIG. 4). Increasing the crude glycerol concentration decreased the volume of the foamy intermediate. The thermal behavior of the intermediates with different lignin-crude glycerol formulations was investigated by TGA (FIG. 5). The thermal stability of the intermediates decreased with increasing concentration of crude glycerol. The weight of the residue above ~500° C. also decreased with higher content of glycerol, which is expected because glycerol is small molecule.

Example 3: Synthesis of Biocarbon from Lignin Modified with Glycine

The sodium lignosulfonate (L) and glycine, at weight ratios of 95:5, 90:10, 85:15 and 80:20, were dissolved in distilled water (solvent). The resulting black colored solutions were concentrated at 90° C. under constant stirring for 6 hours. Continuous water evaporation led to the formation of highly viscous resins, which were further dried at 150° C. for 12 hours. During the drying process, the viscous resins expanded to 10 to 15 times of their original volume, resulting in the porous solid masses shown in FIG. 6. The intermediate prepared with 10% glycine showed the highest volume of expansion.

The thermal decomposition behavior of the intermediates with different lignin-glycine ratios was investigated with TGA (FIG. 7). There is an increase of thermal stability with increasing glycine concentration. The residual weight above ~500° C. is lower for higher glycine concentrations.

Example 4: Synthesis of Biocarbon Nanofibers from Lignin Modified with Urea

The sodium lignosulfonate (L) (about 35 wt. %) and urea (about 1 wt. %) were dissolved in distilled water (solvent). The mixture was concentrated at 90° C. under constant stirring for 6 h. The evaporation of most of the water resulted in a highly viscous resin. The obtained resin was heated in a 170° C. oven overnight, leading to the formation of porous intermediates. The intermediates were carbonized in a vertical pyrolyzer at 700° C. for 3 h. The carbonized material was milled with a planetary ball mill (Retsch PM 100) for 12 h or 24 h. The milling media consisted of 64 ceramic balls, with each ball having a diameter of 10 mm and weight of 3 grams, and 2 steel balls, with each ball having a diameter of 40 mm and weight of 257 g. The rotation speed was 300 rpm.

Figure 8B:
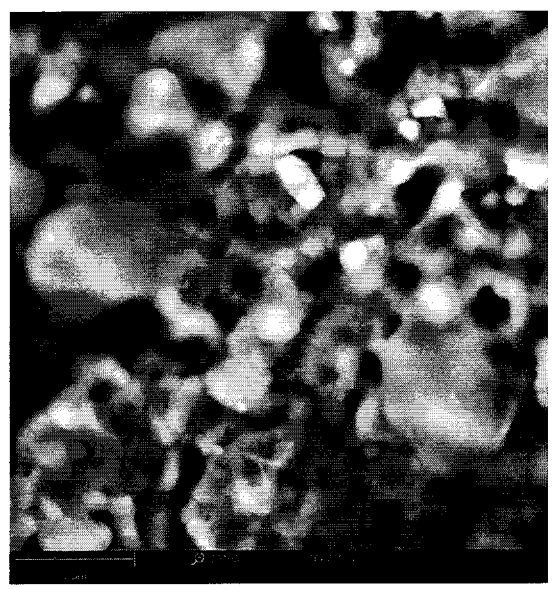
Figure 9A:
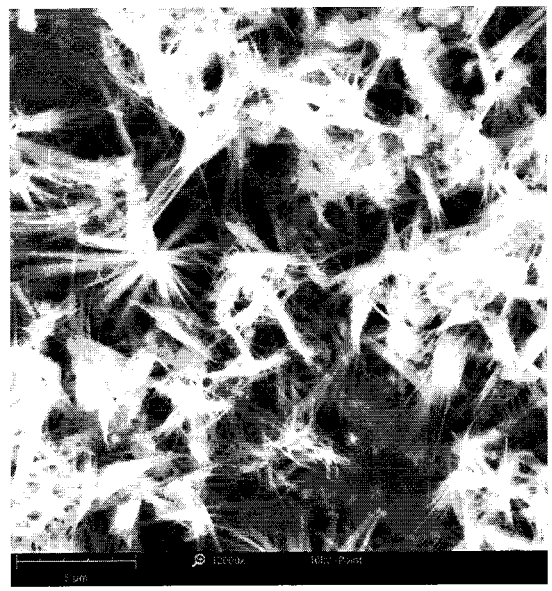
Figure 9B:
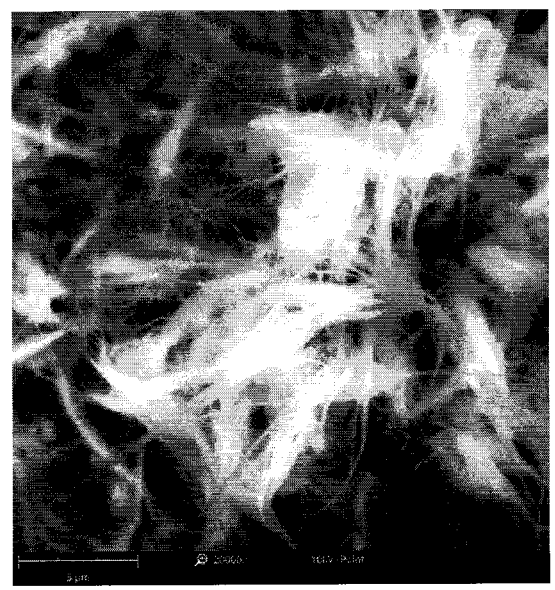
Figure 9C:
Figure 9D:
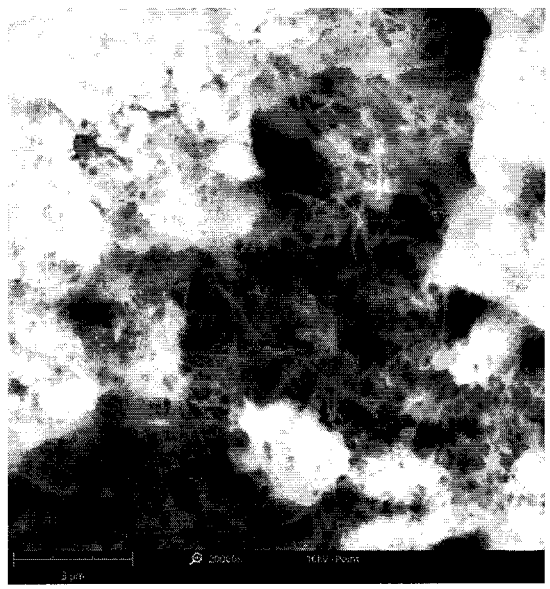

The morphology of the material obtained was studied by using a scanning electron microscope (Phenom ProX, Phenom-World, The Netherlands). FIGS. 8a and 8b show that the carbonized lignin-urea intermediate has a highly porous structure, with the size of many pores on the order of one micrometer. FIGS. 9A to 9D show that after ball milling the carbonized lignin-urea intermediate was transformed to fibers with average diameter below 100 nanometers. The nanofibers obtained by 12 h ball milling had high aspect-ratio, while an additional 12 h ball milling reduced the fibers to needle-like nano-rods.

Table 1 shows the weight changes of the different formulations of lignin and acrylamide, crude glycerol, glycine, or urea during and after the treatments. Among the various compositions, lignin with 20 wt. % urea resulted in the highest yield of the carbon product (30 wt. %).

TABLE 1

Weight changes after chemical modification and carbonization

| Composition | Initial weight (g) | Weight after chemical modification (intermediate) (g) | Weight after Carbonization (g) | % of yield after carbonization |
|---|---|---|---|---|
| 100% L | 100 | 57 | 26 | 26 |
| 95% L + 5% A | 100 | 60 | 25 | 25 |
| 90% L + 10% A | 100 | 51 | 23 | 23 |
| 85% L + 15% A | 100 | 48 | 19 | 19 |
| 80% L + 20% A | 100 | 46 | 17 | 17 |
| 95% L + 5% CG | 100 | 54 | 24 | 24 |
| 90% L + 10% CG | 100 | 51 | 22 | 22 |
| 85% L + 15% CG | 100 | 48 | 19 | 19 |
| 80% L + 20% CG | 100 | 47 | 18 | 18 |
| 95% L + 5% G | 100 | 59 | 26 | 26 |
| 90% L + 10% G | 100 | 59 | 26 | 26 |
| 85% L + 15% G | 100 | 58 | 23 | 23 |
| 80% L + 20% G | 100 | 57 | 26 | 26 |
| 95% L + 5% U | 100 | 60 | 29 | 29 |
| 90% L + 10% U | 100 | 56 | 27 | 27 |
| 85% L + 15% U | 100 | 60 | 29 | 29 |
| 80% L + 20% U | 100 | 63 | 30 | 30 |

L: lignin; A: acrylamide; CG: crude glycerol; G: glycine; U: urea

Example 5: Synthesis of Carbon Particles from Biomass WITH and WITHOUT the Foaming Step A 1-3 cm forage harvested miscanthus containing 10 wt. % moisture was pyrolyzed in a commercial auger in an oxygen deprived environment at 700° C. One sample of the carbonized biomass was ball milled directly for 2 and 4 h. The second sample was mixed with the foaming agents, urea (5 wt. % of the carbonized biomass) and glycerol (5 wt. % of the carbonized biomass) dissolved in water, heated in an oven at 200° C., and then ball milled for 2 and 4 hours. The ball mill used was a Patterson Industries D-Type Wet Batch Ball Mill, which had a ceramic-lined vessel 60" long and 72" in diameter. It was filled with 6000 lbs of ceramic balls with diameters ranging from ¾" to 1½" and operated at a rotation speed of 300 rpm.

Particle size analysis was carried out by using a scanning electron microscope (Phenom ProX, Phenom-World, The Netherlands) equipped with the ParticleMetric application. The sample powder was deposited on carbon tabs adhered to aluminum stubs and imaged without coating. SEM images obtained at different magnifications were analyzed with the size analysis application. The circle equivalent diameter was used to represent the average size of the particle and the number average size and size distribution were calculated.

As can be seen from the comparison in Table 2, the material obtained with the foaming step showed smaller average particle size than the material obtained without foaming.

Example 6: Synthesis of Sub-Micron Carbon Particles from Biomass by the Foaming-Carbonization-Milling Process A mixture of coffee chaff and water-insoluble Kraft lignin at a ratio of 80 to 20 was mixed with the foaming agents, urea (5 wt. % of the biomass) and crude glycerol (5 wt. % of the biomass), and water in a high-intensity mixer as shown in FIG. 10. The mixture was heated in a commercial auger at 600-700° C. for ~10 min, as shown in FIG. 11. The material was then milled for 6 h using a planetary ball mill (Retsch PM 100). The milling media consisted of 64 ceramic balls (Diameter: 10 mm) and 2 steel balls (Diameter: 40 mm). The rotation speed was 300 rpm.

Particle size analysis was performed with the same method as in Example 5. The number average particle size was found to be 970 nm and the percentage of particles smaller than 1 µm was 66% (Table 2).

Example 7: Synthesis of Sub-Micron Carbon Particles from Biomass by the Carbonization-Grinding-Foaming-Milling Process Carried Out in Commercial Auger A mixture of coffee chaff and miscanthus at a ratio of 80 to 20 was carbonized in a commercial auger at 625° C. for ~10 min (FIG. 11). The char was milled in a hammer mill to pass a 1/64" screen. A schematic of the hammer mill is shown in FIG. 12. The foaming agents, urea (7.5 wt. % of the carbonized biomass) and crude glycerol (5 wt. % of the carbonized biomass) was dissolved in water in a high-intensity mixer as shown in FIG. 10. The carbonized biomass was then mixed with the dissolved foaming agents (with water content at approximately 60 wt. %) in a ribbon blender (FIGS. 13A and 13B). The paste was heated in the auger for 9 hours and then passed through a 2-roll mill 4 times. The material was then milled for 12 h using a planetary ball mill (Retsch PM 100). The milling media consisted of 64 ceramic balls (Diameter: 10 mm) and 2 steel balls (Diameter: 40 mm). The rotation speed was 300 rpm.

Particle size analysis was carried out by using a scanning electron microscope (Phenom ProX, Phenom-World, The Netherlands) equipped with the ParticleMetric application. The sample powder was deposited on carbon tabs adhered to aluminum stubs and imaged without coating. The SEM integrated with ParticleMetric was used to gather the morphology and particle size data. The circle equivalent diameter was used to represent the size of the particle and the number average size and size distribution were calculated.

Particle size analysis was performed with the same method as in Example 5. The number average particle size was found to be 750 nm and the percentage of particles smaller than 1 µm was 80% (Table 2). A typical SEM image of the carbon particles produced is shown in FIG. 14.

Example 8: Biomass Carbonized in Auger and then Foamed in Oven

The 1-3 cm forage harvested miscanthus containing 10 wt. % moisture was pyrolyzed in a commercial auger in an oxygen deprived environment at 700° C. for 10-20 minutes until completely charred. The carbonized biomass was milled in a hammer mill to pass a 1/64" screen. Corn syrup (10 wt. % of the carbonized biomass), baking powder (2.7 wt. % of the carbonized biomass), and succinic acid (2.7 wt. % of the carbonized biomass) were dissolved in water with a high intensity mixer. The solution was mixed with the carbonized biomass in a ribbon blender to form a thick paste, which was then heated in an oven at 200° C. for 24 hours. The solids were milled for 12 h using a planetary ball mill (Retsch PM 100).

Particle size analysis was performed with the same method as in Example 5. The number average particle size was found to be 860 nm and the percentage of particles smaller than 1 µm was 74% (Table 2).

Example 9: Synthesis of Carbon Particles from Biomass Followed by Steam Jet Milling The 1-3 cm forage harvested miscanthus containing 10 wt. % moisture was carbonized in a commercial auger in an oxygen deprived environment at 700° C. for 10 to 15 min. The carbonized biomass was foamed directly in the auger with urea (10 wt. % of the carbonized biomass), glycerol (5 wt. % of the carbonized biomass), and water. The material was first milled in a hammer mill to pass a 1/128" screen and then steam jet milled. A sample of the jet-milled material was also further ball milled for 12 h.

The SEM images of the jet milled sample before and after the additional ball milling step is presented in FIGS. 15A and 15B, respectively. The jet-milled particles showed square-shaped morphology. Some of the particles remained at the same size after ball milling, only with their corners rounded, while the other particles were milled down to much smaller sizes, which can also be seen in Table 2.

Example 10: Synthesis of Carbon Particles from Wood Chips

Hardwood chips were carbonized in a commercial auger at 600-700° C. The carbonized wood chips were foamed with urea (5 wt. % of the carbonized biomass) and crude glycerol (5 wt. % of the carbonized biomass) and water in the oven at 150-200° C.

Example 11: Microwave-Assisted Foaming of the Carbonized Biomass

The 1-3 cm forage harvested miscanthus containing 10 wt. % moisture was carbonized in a commercial auger at 600-700° C. The carbonized biomass was mixed with urea (10 wt. % of the carbonized biomass), succinic acid (2 wt. % of the carbonized biomass), baking powder (2 wt. % of the carbonized biomass) and water to form a slurry. The mixture was heated in a microwave oven for about 1 h. The foamy intermediate obtained was dried and milled for 12 h using a planetary ball mill (Retsch PM 100). The milling media consisted of 64 ceramic balls (Diameter: 10 mm) and 2 steel balls (Diameter: 40 mm). The rotation speed was 300 rpm.

Particle size analysis was performed with the same method as in Example 5. The number average particle size was found to be 810 nm and the percentage of particles smaller than 1 μm was 74% (Table 2).

TABLE 2

Comparison of the particle sizes of the biocarbon obtained with and without the foaming step (Example 5)

| Raw material | Treatment | Industrial ball milling | Average particle size (Circular equivalent diameter) | % of particles smaller than 500 nm | % of particles smaller than 1 μm |
|---|---|---|---|---|---|
| Miscanthus | Carbonization | 2 h | 2.46 μm | 0 | 9.7 |
| | Carbonization followed by foaming | | 1.72 μm | 0 | 19.9 |
| | Carbonization | 4 h | 1.53 μm | 3.5 | 40.1 |
| | Carbonization followed by foaming | | 940 nm | 22.6 | 70.0 |

TABLE 3

The average sizes of the biocarbon particles obtained from biomass in the examples of the method

| | Raw materials | Brief description of treatment | Average particle size (Circular equivalent diameter) | % of particles smaller than 500 nm | % of particles smaller than 1 μm |
|---|---|---|---|---|---|
| Ex. 6 | Coffee chaff and lignin (80/20) | Mixed with 5 phr urea, 5 phr crude glycerol, and water; Foamed in commercial auger; Ball milled 6 h | 970 nm | 24.2 | 66.4 |
| Ex. 7 | Coffee chaff and miscanthus (80/20) | Carbonization in commercial auger at 625° C. for ~10 min; Hammer milled to pass 1/64" screen; Foamed with 7.5 phr urea and 5 phr glycerol; Milled 4 times in a 2-roll mill; Ball milled 12 h | 750 nm | 32.9 | 80.4 |
| Ex. 8 | Miscanthus | Carbonization in commercial auger at 700° C. for 10-20 min; Hammer milled to pass 1/64" screen; Foamed with 10 phr corn syrup, 2.7 phr baking powder, and 2.7 phr succinic acid in an oven at 200° C. for 24 h; Ball milled 12 h | 860 nm | 30.8 | 74.2 |

TABLE 3-continued

The average sizes of the biocarbon particles obtained from biomass in the examples of the method

| | Raw materials | Brief description of treatment | Average particle size (Circular equivalent diameter) | % of particles smaller than 500 nm | % of particles smaller than 1 μm |
|---|---|---|---|---|---|
| Ex. 9 | Miscanthus | Carbonization in commercial auger at 700° C. for 10-15 min; Foamed with 10 phr urea and 5% glycerol; Hammer milled to pass 1/128" screen; Steam jet milled | 980 nm | 20.3 | 57.1 |
| | | The sample above ball milled for 12 h | 600 nm | 50.4 | 86.9 |
| Ex. 11 | Miscanthus | Carbonization in commercial auger; Foamed with 10% urea, 2% succinic acid, and 2% baking powder in microwave oven; Dried and ball milled 12 h | 810 nm | 30.0 | 74.3 |

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety. Where a term in the present application is found to be defined differently in a document incorporated herein by reference, the definition provided herein is to serve as the definition for the term.

What is claimed is:

1. A method for producing biobased sub-micron biocarbon materials, said method comprising (a) forming a porous intermediate structure by either (i) mixing raw biomass with a foaming agent and carbonizing the mixture, or (ii) mixing carbonized and ground biomass with the foaming agent; and (b) size reducing the porous intermediate structure to an average particle size less than about 1,000 nanometers, thereby producing the biobased sub-micron biocarbon materials.

2. The method of claim 1, wherein the porous intermediate structure is formed before or after carbonization by:
 (a) obtaining a homogenous dispersion in a solvent comprising the foaming agent and the raw biomass or the carbonized and ground biomass;
 (b) heating the obtained dispersion under stirring to form a viscous resin; and
 (c) heating the viscous resin to form the porous intermediate structure.

3. The method of claim 1, wherein the size reducing step comprises milling the porous intermediate to the average particle size less than about 1,000 nm to produce the sub-micron biocarbon materials.

4. The method of claim 1, wherein the biomass is selected from the group consisting of agricultural biomass, woody biomass, lignin and coffee chaff.

5. The method of claim 2, wherein the homogenous dispersion is either a solution in the case of water-soluble biomass or a suspension for other types of biomass.

6. The method of claim 1, wherein the foaming agent is one or more organic polyol, one or more organic nitrogen-containing compound, or a mixture thereof.

7. The method of claim 2, wherein the ratio of biomass: foaming agent (wt. %:wt. %) in the homogenous dispersion is between 99:1 to 50:50.

8. The method of claim 2, wherein the foaming agent is glycerol and the weight ratio of biomass:glycerol is between 95:5 to 80:20.

9. The method of claim 2, wherein the foaming agent is acrylamide and the weight ratio of biomass:acrylamide is between 95:5 to 80:20.

10. The method of claim 9, wherein the weight ratio of biomass:acrylamide is about 85:15 or about 80:20 and the sub-micron biocarbon materials are in the form of uniform spherical particles.

11. The method of claim 2, wherein the foaming agents is glycine and the weight ratio of biomass:glycine is between 95:5 to 80:20.

12. The method of claim 2, wherein the foaming agent is urea and the weight ratio of biomass:urea is between 97:3 to 80:20.

13. The method of claim 12, wherein the weight ratio of biomass:urea is about 97:3 and the sub-micron biocarbon materials obtained are in the form of nanofibers.

14. The method of claim 2, wherein the solvent used is water.

15. The method of claim 2, wherein step (b) comprises heating the dispersion under stirring at a temperature of about 80° C. to about 200° C. for about 1 hour to about 24 hours.

16. The method of claim 2, wherein step (c) comprises heating the viscous resin at a temperature of about 140° C. to about 200° C., for about 10 hours to about 15 hours, to obtain the porous intermediate structure.

17. The method of claim 2, wherein the porous intermediate is further heated in an inert atmosphere at a temperature of about 400° C. to about 900° C. for about 1 hour to about 12 hours.

18. The method of claim 1, wherein the foaming agent is one or more of glycerol, bio-glycerol, urea, acrylamide, corn syrup, sodium bicarbonate, and succinic acid.

19. The method of claim 2, wherein the forming of the porous intermediate structure is carried out in a conventional oven, in a heated auger or in a microwave oven.

20. The method of claim 3, wherein the milling of the porous intermediate is carried out in a planetary ball mill with different milling media, in a wet or dry particle size reduction process or in a jet mill using compressed air, inert gas, or steam.

21. The method according to claim 1, wherein the foaming agent is inorganic.

22. The method according to claim 1, wherein the average particle size is smaller than 500 nm.

\* \* \* \* \*